United States Patent [19]

Epkens

[11] Patent Number: 5,529,421
[45] Date of Patent: Jun. 25, 1996

[54] HARSH ENVIRONMENT SWIVEL

[75] Inventor: Heiko Epkens, Vancouver, Canada

[73] Assignee: DCD Design & Manufacturing Ltd., Delta British Columbia, Canada

[21] Appl. No.: 163,521

[22] Filed: Dec. 9, 1993

[51] Int. Cl.[6] ........................................ H02G 3/22
[52] U.S. Cl. ........................................ 403/164; 403/78
[58] Field of Search ........................... 403/165, 164, 403/78, 60, 66; 254/134.3 FT; 277/88, 152, 178, 235; 294/82.1, 82.11; 59/95, 9

[56] References Cited

U.S. PATENT DOCUMENTS

| | | |
|---|---|---|
| 1,959,823 | 5/1934 | Greve . |
| 2,003,934 | 6/1935 | Hausel . |
| 2,246,588 | 6/1941 | Harrall ........................ 403/165 X |
| 2,253,932 | 8/1941 | Gilkerson . |
| 2,602,679 | 7/1952 | Malmsten ........................ 403/164 |
| 2,651,533 | 9/1953 | Miller ........................ 403/164 |
| 2,811,378 | 10/1957 | Kalista . |
| 2,837,177 | 6/1958 | Edge et al. . |
| 2,918,335 | 12/1959 | Fruendt . |
| 3,244,440 | 4/1966 | Ashton et al. . |
| 3,490,799 | 1/1970 | Shreeve . |
| 3,844,127 | 10/1974 | Koop, Jr. et al. . |
| 4,552,481 | 11/1985 | Bluett . |
| 4,600,331 | 7/1986 | Gray . |
| 4,669,907 | 6/1987 | Patton . |
| 4,687,365 | 8/1987 | Promersberger . |
| 4,998,551 | 3/1991 | DeSarno . |
| 5,399,042 | 3/1995 | Ivel ........................ 403/165 |

FOREIGN PATENT DOCUMENTS

| | | |
|---|---|---|
| 966.646 | 10/1950 | France . |
| 1026723 | 2/1953 | France ........................ 403/164 |
| 1809307 | 6/1970 | Germany ........................ 59/95 |
| 1915343 | 10/1970 | Germany ........................ 403/164 |
| 2344356 | 3/1974 | Germany . |
| 439986 | 12/1935 | United Kingdom ........................ 59/95 |

OTHER PUBLICATIONS

"Cable Pulling Systems Tools and Accessories", Canada Coupling Inc., selected excerpts from Catalogue dated Jun. 1992.
Katimex Brochure from Katimex Cielker GmbH, 2 pages (undated).

*Primary Examiner*—Anthony Knight
*Attorney, Agent, or Firm*—Fish & Richardson

[57] ABSTRACT

A harsh environment swivel is disclosed. The swivel is of the type having first and second swivel heads located at opposite ends of a generally hollow swivel body. A swivel shaft is attached to the first swivel head and secured within the hollow body by a locking nut. The swivel shaft rotates about tapered roller bearings which transmit tensile loading from the swivel shaft to the hollow body. A plurality of progressively more restrictive seals restrict the passage of debris into the interior of the hollow body. A method of flushing debris from the interior of such a swivel is also disclosed.

12 Claims, 3 Drawing Sheets

5,529,421

HARSH ENVIRONMENT SWIVEL

FIELD OF INVENTION

This invention relates to swivels for providing a rotatable connection between two cables, between a cable and another object, or between two objects. In particular, the invention pertains to such swivels where they may be subjected to harsh environments including being exposed to water or dirt.

BACKGROUND OF THE INVENTION

Swivels and their use are well known. Swivels have commonly been used to connect together two lines or cables where rotation at the point of connection is desired. For example, when an electrical or telecommunications cable is being pulled through a conduit by the use of a pulling or fish line, the cable is typically unrolled off a large reel at one end of the conduit as it is pulled through. As the cable unrolls, it sometimes develops twists that, if not corrected, could damage the cable under the tension applied for long pulls. The use of a swivel between the end of the cable and the pulling line enables any such twists to be removed as the cable may rotate independent of the pulling line.

In other applications, a swivel is critical to the operation of combined underground boring and cable pulling. In this situation, a pilot hole is drilled through the underground structure where a cable is to be run. Once the pilot hole is completed, a drill steel is inserted back through the hole and a cutting head attached to the drill steel. The drill steel is then connected to a boring machine which drives the cutter, either through direct rotation or through the application of pneumatic or hydraulic pressure to motors on the cutter. Typically a cable, or in some instances a conduit or casing, is connected to the rear of the cutting head so that pulling the cutting head back through the pilot hole not only enlarges the pilot hole to the desired diameter but also serves to pull the cable or conduit as the hole is cut. Accordingly, since the cutting head is rotating to enlarge the pilot hole, in order to be able to pull a cable or conduit through the hole a swivel must form part of the connection between the cutting head and the cable or conduit.

Yet a further application of such swivels involves use on cables lifting, such as would be used on cranes or the like. When lifting objects with a crane it is usually desirable or necessary to be able to rotate the lifted object to facilitate movement or re-positioning. In order to prevent the application of rotational forces on the crane's lifting cable, line swivels are often incorporated on the harness or sling used to attach the crane cable to the object.

In each of the above applications, as well as in numerous others, the swivel must be designed to withstand the tensile force applied to it under use and must be able to operate in environments that may subject the swivel to water and dirt. For example, when used in underground boring applications the swivel will be directly subjected to water and dirt and may even be completely submerged in mud or debris at times. Similarly, when pulling cables through underground conduit, one often encounters conduits filled with water or mud. In lifting operations, line swivels are typically exposed to rain, sleet or snow and are often subjected to significant tensile loading.

Others have recognized these design criteria and attempted to develop line swivels capable of operating under such environments, and capable of withstanding the tensile loading to which they may be subjected, but have failed. In order to be able to withstand the load to which the swivel may be exposed, others have commonly increased the size of the components of the swivel, including ball bearing components as are typically used. While this may be one manner of approaching the problem, the result is sometimes a swivel too large in physical dimension for the desired task. In addition increasing the physical size of the swivel increases its weight and normally its cost.

Similarly the methods of sealing swivels against water and debris that have been used or proposed to date have met with limited success. The means of sealing that have been used are only effective under limited exposure in terms of both time and quantity of water and debris to which the swivel may be subjected, and comprise the use of a simple "O" ring seal.

The result of these shortcomings is that swivels currently in use have a significantly reduced operational life span when used in harsh environments. Once water or dirt penetrates into the interior of the swivel, corrosion, freezing in low temperatures, and reduced bearing life usually result. As well, significant tensile loading quickly causes ball bearings to fail or wear prematurely.

SUMMARY OF THE INVENTION

The invention therefore provides a swivel which overcomes the shortcomings of the prior devices through the incorporation of a structure which is able to withstand both the tensile and rotational forces that may be applied to it and which is able to perform under harsh environment conditions. The invention also provides a swivel which may be equally used in underground boring situations, pulling cable through a conduit, or in vertical lifting operations.

Accordingly, in one of its aspects the invention provides a harsh environment swivel comprising: first and second swivel heads situated at opposite ends of a generally hollow swivel body, said first swivel head in rotational engagement with said hollow body and said second swivel head fixed to said hollow body; a swivel shaft attached to said first swivel head and rotationally received within said hollow body, retaining means securing said swivel shaft within said hollow body; said retaining means permitting rotational movement of said shaft, and hence said first swivel head, relative to said hollow body and said second swivel head; bearing means within said hollow body allowing for reduced frictional rotation of said swivel shaft within said hollow body when said swivel shaft is under tensile loading; and, a plurality of sealing means between said first swivel head, said swivel shaft and said hollow body, said sealing means progressively more restrictive to the passage of particulate and liquid debris from a position exterior to said hollow body to the interior of said hollow body.

In another aspect of the present invention the bearing means includes a first set of tapered roller bearings located on the interior surface of the hollow body and encompassing the swivel shaft wherein the tapered roller bearings are interior to the sealing means.

In yet a further embodiment, the present invention includes a grease fitting communicating with the interior of the hollow body such that injection of grease through the fitting forces debris within the hollow body back through the sealing means to be expelled from the swivel.

In still yet a further embodiment the invention comprises a method for flushing debris from the interior of a swivel, having sealing means and bearing means interior to said sealing means, comprising injecting grease into the interior of the swivel in a direction opposite to the direction of entry of debris and away from said bearing means out of the interior of the swivel.

BRIEF DESCRIPTION OF THE DRAWINGS

For a better understanding of the present invention, and to show more clearly how it may be carried into effect, reference will now be made, by way of example, to the accompanying drawings which show the preferred embodiments of the present invention in which.

DESCRIPTION OF THE PREFERRED EMBODIMENT

Figure 1:
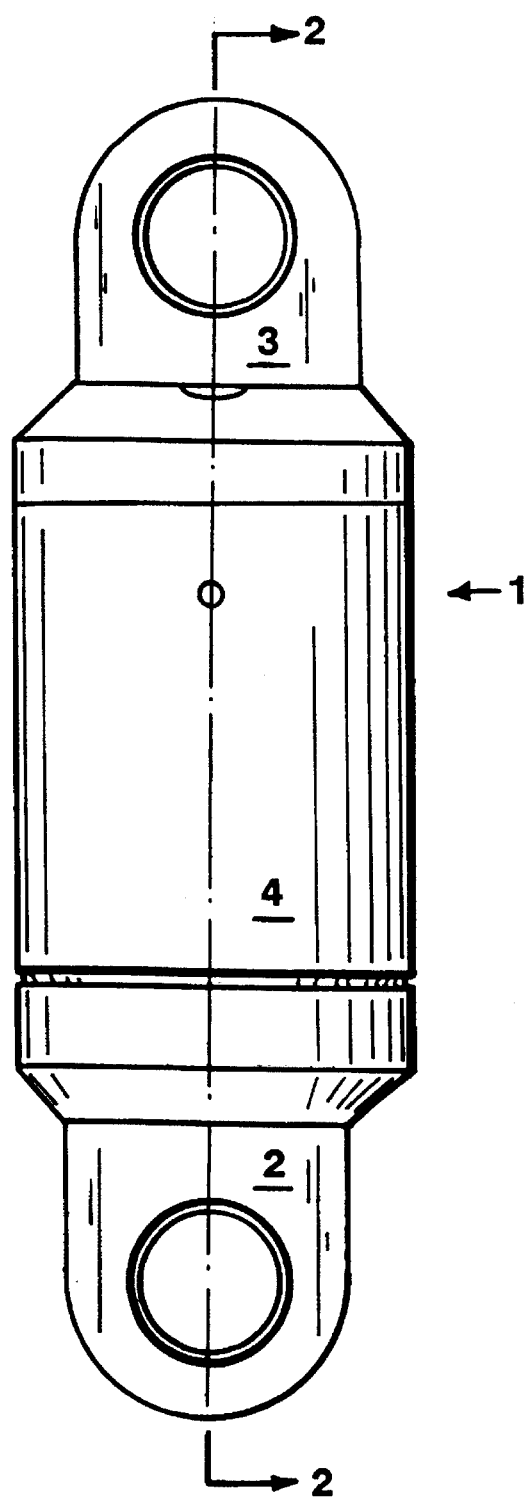
FIG. 1 is a side view of the swivel of the invention.

Referring to FIG. 1, a swivel is shown pursuant to the present invention noted generally by the numeral 1. The swivel 1 generally comprises first and second swivel heads, 2 and 3 respectively, and a swivel body 4.

Figure 2:
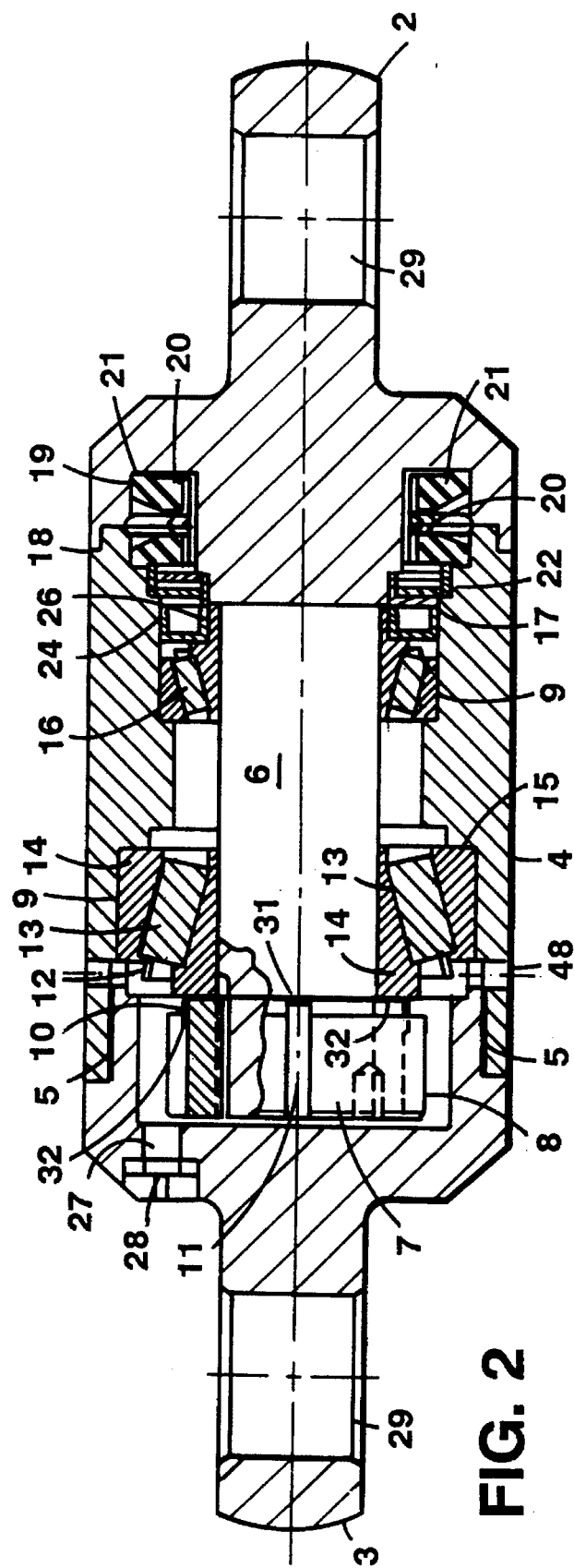
FIG. 2 is a sectional view of the swivel of the present invention taken along the line 2—2 in FIG. 1.

As is more clearly shown in FIG. 2, swivel body 4 is generally hollow in nature. In the preferred embodiment second swivel head 3 is fixed to hollow body 4 while first swivel head 2 is able to freely rotate about hollow body 4. Preferably hollow body 4 and second swivel head 3 are fitted with threads (generally noted at 5) such that swivel head 3 can be screwed onto hollow body 4 and tightened in place. In order to prevent these parts from vibrating loose during use, a set screw, located in hollow body 4 at the point of threaded engagement with second swivel head 3, is tightened against the threads of swivel head 3.

The amount of overlap of hollow body 4 and second swivel head 3 at their point of contact is sufficient to ensure adequate strength of the connection and also sufficient to prevent the entry of liquid or debris into the interior of hollow body 4 along threads 5. However, in order to increase the sealing effect of threads 5 even more, a suitable threading compound may be applied to threads 5 before second swivel head 3 is threaded onto hollow body 4.

As is also shown in FIG. 2, attached to first swivel head 2 is a swivel shaft 6 which is received within hollow body 4. Typically swivel shaft 6 would be merely an extension of first swivel head 2, both being of unitary construction. However, it will be appreciated by those skilled in the art that swivel shaft 6 may also be threaded or attached by other means to first swivel head 2. Swivel shaft 6 is secured within hollow body 4 by retaining means 7. Retaining means 7 generally comprises a locking nut 8 which is threaded onto the end of swivel shaft 6 and tightened against bearing means 9 thereby securing swivel shaft 6 firmly in place.

The tensile force to which swivel 1 is subjected will be born by locking nut 8. Accordingly it is critical that locking nut 8 not loosen or fall off under use, particularly in light of the fact that swivel shaft 6, and hence locking nut 8, will be under the influence of rotational force when in use. For this reason, a lock washer 10 is situated between locking nut 8 and bearing means 9. To ensure that lock washer 10 itself does not rotate during operation, its inside diameter is fitted with a clip 31 which is received in one of a series of keyways 11 on locking nut 8. Furthermore, lock washer 10 has numerous tabs 32 extending radially outward from its outer diameter. During assembly of the swivel, some of the tabs 32 will be bent so as to engage keyways 11 in locking nut 8, while others will be left to increase the frictional contact between lock washer 10 and swivel shaft 6 as is the situation when using a typical lock washer. Thus clip 31 serves to assist in preventing lock washer 10 from rotating while tabs 32 prevent the locking nut 8 from becoming loosened. In addition, in the preferred embodiment a key (not shown) may be inserted into one of the keyways 11, and into corresponding keyways (not shown) on shaft 6, to prevent locking nut 8 from being loosened during operation.

As mentioned, locking nut 8 is tightened against bearing means 9 to hold swivel shaft 6 in place. Bearing means 9 serves to permit swivel shaft 6 to rotate within hollow body 4 under reduced friction. It will be appreciated by those skilled in the art that when in use swivel 1 will experience rotational as well as tensile forces. Prior devices have been concerned primarily with the rotational forces developed within the swivel and have utilized various types of ball bearings to reduce rotational friction. Such bearings do not, however, address the tensile forces applied to the swivel.

In the present invention the applicant has found that utilizing tapered roller bearings within hollow body 4 serves the dual function of reducing friction resulting from both the rotational movement of swivel shaft 6 and from tensile loading. As can be seen in FIG. 2, tapered roller bearings 12, comprising bearing elements 13 and a casing 14, are located within hollow body 4, and encompass swivel shaft 6. Bearing elements 13 are rollers that are able to withstand significantly more force than mere ball bearings. Furthermore, it will be understood that the slight taper of the bearings 13 (with the larger end closest to locking nut 8) increases the ability of the swivel to accommodate the substantial tensile or axial loading to which it will be subjected.

The casing 14 of tapered roller bearings 12 bears against shoulder 15 of hollow body 4. FIG. 2 also shows that lock washer 10 and locking nut 8 bear against the opposite end of casing 14 such that tile tensile loading of swivel shaft 6 is transferred through roller bearings 12 to hollow body 4. It can now be appreciated that tile function of locking nut 8 is to both hold swivel shaft 6 within hollow body 4 and to allow for roller bearings 12 to be loaded into hollow body 4 and be held firmly in place through torquing locking nut 8. As discussed above, tabs 32 of lock washer 10 can then be bent over to be received within one of keyways 11 to prevent rotation of locking nut 8.

In order to stabilize swivel shaft 6 within hollow body 4, the preferred embodiment includes a further second set of tapered roller bearings 16 situated at a distance from the first set of tapered roller bearings 12. Second set of tapered roller bearings 16 are substantially the same as roller bearings 12 with the exception that they may be smaller since they do not act as thrust bearings and do not bear the tensile force exerted on swivel shaft 6.

As with generally all forms of bearings, it is important that the tapered roller bearings 12 and 16 remain free from the effects of moisture and debris which can reduce their effectiveness and operating life. Accordingly the present invention incorporates the use of a plurality of sealing means 17 between first swivel head 2, swivel shaft 6 and hollow body 4. Sealing means 17 are designed such that they progressively restrict the passage of liquid or debris into the interior of hollow body 4. As will be seen from FIG. 2, tapered roller bearings 12 and 16 are interior to sealing means 17 to protect them from moisture or debris that may enter the swivel.

In the preferred embodiment, sealing means 17 comprises a series of four separate and distinct seals. The first seal is a gap seal, represented in FIG. 2 by the numeral 18. Gap seal 18 is formed through the overlapping of first swivel head 2 and the outer surface of hollow body 4. When locking nut 8 is tightened onto the end of swivel shaft 6, first swivel head 2 is brought into close proximity to hollow body 4 such that the space between the two components, and the overlapping of them, creates a line gap which excludes dirt particles of a larger diameter. In addition, since first swivel head 2 overlaps hollow body 4, as opposed to hollow body 4 overlapping first swivel head 2, water is less likely to enter through gap seal 18 when swivel 1 is pulled in the direction of first swivel head 1.

Sealing means 17 also includes a second seal 19 situated between said first swivel head and said hollow body 4. Second seal 19 is interior to gap seal 18 such that it operates as a secondary sealing means to restrict passage of debris that passes through gap seal 18. In the preferred embodiment, second seal 19 comprises a pair of contacting ring members 20 which bear against one another providing a sealing effect. One of each of the contacting ring members 20 is attached to first swivel head 2 and hollow body 4 through webs 21. Webs 21 cause ring members 20 to be held together tightly to increasing their sealing effect. Since ring members 20 are attached to first swivel head 2 and hollow body 4, they are able to rotate relative to each other with the rotation of first swivel head 2, An example of a commercially available seal which may be used as second seal 19 is the CR HDDF #18259 seal manufactured by SKF.

FIG. 2 shows third sealing means 22, located interior to second sealing means 19. Third sealing means 22 restricts the passage of debris that may pass through second sealing means 19 and acts as yet a further progressive seal to protect the interior mechanisms of hollow body 4. Since any material which reaches third sealing means 22 must have already passed through gap seal 18 and second sealing means 19, third sealing means 22 is designed to filter out materials of a relatively fine size grain. Third sealing means 22 preferably comprises a pair of sealing rotatable flocked washers 23. One of the flocked washers is attached to each of first swivel head 2 and hollow body 4 such that the washers 23 are in close proximity. Opposing faces of flocked washers 23 contain fibrous material 30 that interlocks (as shown in FIG. 2 ) forming a seal against small diameter debris. Although the fibrous material 30 interlocks together, the bond created is such as not to significantly hinder the rotational movement of first swivel head 1.

Sealing means 17 further comprises a fourth sealing means 24 which is situated :interior to third sealing means 22 and designed to restrict passage of liquid or debris which may pass through third sealing means 22. As shown in FIG. 2, fourth sealing means 24 is a radial lip seal (such as the commercially available CR #15846 seal manufactured by SKF) which is fixed to the interior of hollow body 4 and has a lip 25 biased against an abutment ring 26 mounted around swivel shaft 6. The biasing of lip 25 against ring 26 creates a further sealing means to restrict the entry of material into hollow body 4. The primary function of ring 26 is to facilitate the entry of swivel shaft 6 into hollow body 4 during the assembly stage of the swivel. However, ring 26 also provides a clean, smooth surface against which lip 25 bears to enhance the effectiveness of the seal.

Figure 3:
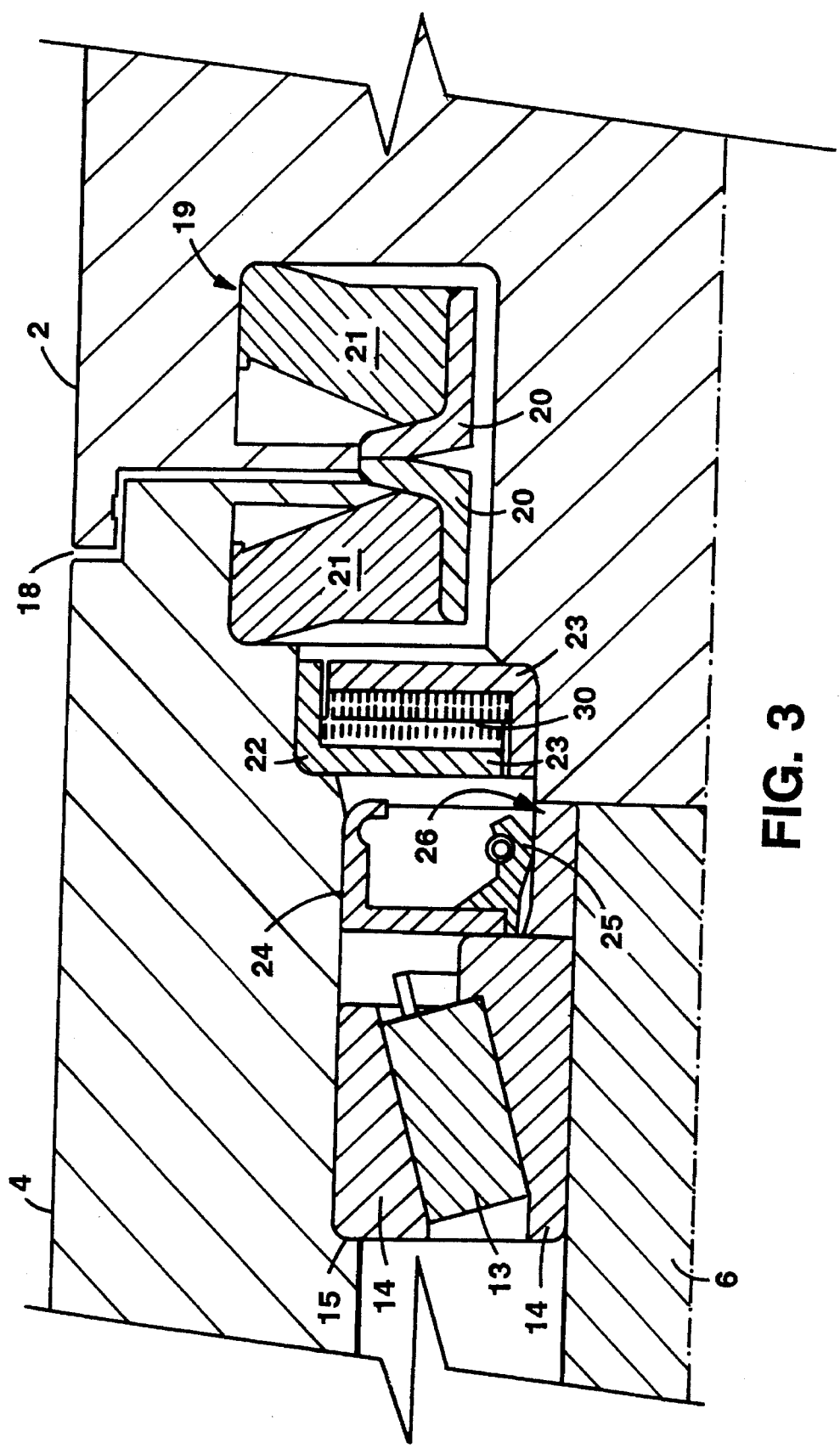
FIG. 3 is an enlarged view of the sealing means of the invention as shown in FIG. 2.

The configuration of gap seal 18, second sealing means 19, third sealing means 22, fourth sealing means 24, and their surrounding structures is more clearly shown in FIG. 3.

Swivel 1 is equipped with means 27 to flush out debris that somehow manages to penetrate sealing means 17 and enters the interior of hollow body 4. Means 27 comprises a grease fitting 28 which is threaded into swivel 1 such that it communicates directly with the interior of hollow body 4. Grease may then be injected through fitting 28 to force any debris within hollow body 4 back through sealing means 24, 22, 19, and 18 and out of swivel 1. Fitting 28 also serves as a means to introduce a lubricant into hollow body 4 to reduce the opportunity for corrosion and to lubricate bearing means 9.

As is shown in FIGS. 1 and 2, first and second swivel heads 2 and 3 are typically fitted with pulling eyes 29 to allow swivel 1 to be connected to cables or other objects, such as a clevis on a cutter used in underground boring. Pulling eyes 29 are shown as flatten portions with holes extending through them for connection to cables or the like. It will of course be appreciated by those skilled in the art that pulling eyes 29 may be of different configurations depending upon the nature of the cable or object to be connected. For example, pulling eyes 29 in an alternate embodiment could be parallel lugs with a cross bolt extending therethrough such that a looped cable may be retained.

In the preferred embodiment, first and second swivel heads 2 and 3, hollow body 4 and swivel shaft 6 are constructed from a high strength, corrosion resistant metal so as to be able to withstand the forces and environments under which they may be used.

In operation swivel 1 may be connected to a pulling line, crane or lifting cable, or to an object such as a rotating cutting head in underground boring. Due to the structure of the swivel it may be used in practically any tensile loading situation where rotational movement is required or likely. Where used in a pulling situation or in underground boring, first swivel head 2 will typically be connected to the "leading end" of the pulling cable or to the rear of the cutting head. In this configuration, the overlapping of first swivel head 2 over hollow body 4 helps to assist in restricting the entry of debris into the swivel. In addition, grease fitting 28, as shown in FIG. 2, will not be as susceptible to plugging with dirt. Once first swivel head 2 is connected, the cable to be pulled or lifted may then be attached to second swivel head 3 thereby allowing the two swivel heads and their connected cables or parts to rotate independently.

It is to be understood that what has been described are the preferred embodiments of the invention and that it is possible to make variations to these embodiments while staying within the broad scope of the invention. Some of these variations have been discussed while others will be readily apparent to those skilled in the art to which the invention relates. For example, while reference has been made to abutment ring 26 upon which lip 25 bears, lip 25 could equally bear directly against swivel shaft 6.

We claim:

1. A harsh environment swivel comprising:

(a) first and second swivel heads situated at opposite ends of a generally hollow swivel body, said first swivel head in rotational engagement with said hollow body and said second swivel head fixed to said hollow body, (b) a swivel shaft attached to said first swivel head and rotationally received within said hollow body, (c) retaining means securing said swivel shaft within said hollow body, said retaining means permitting rotational movement of said shaft, and hence said first swivel head, relative to said hollow body and said second swivel head, (d) bearing means within said hollow body, said bearing means allowing for reduced frictional rotation of said swivel shaft within said hollow body when said swivel shaft is under tensile loading as well as when said swivel shaft is subjected to compressive loading, wherein said bearing means includes a first set of tapered roller bearings located on the interior surface of said hollow body and encompassing said swivel shaft, said tapered roller bearings situated interior to said sealing means and allowing for reduced frictional rotation of said swivel shaft within said hollow body when said swivel shaft is subjected to tensile loading; and (e) a plurality of sealing means between said first swivel head, said swivel shaft and said hollow body, said sealing means being progressively more restrictive to the passage of particulate and liquid debris from a position exterior to said hollow body to the interior of said hollow body.

2. A swivel as claimed in claim 1 wherein said retaining means comprises a locking nut threaded onto the end of said swivel shaft, said locking nut being tightened against said tapered roller bearings thereby securing said swivel shaft within said hollow body.

3. A swivel as claimed in claim 2 wherein said sealing means includes a first gap seal between the outer surfaces of said first swivel head and said hollow body member, said gap seal restricting the passage of particulate material into said hollow body.

4. A swivel as claimed in claim 3 wherein said sealing means further includes a second seal situated between said first swivel head and said hollow body member, said second seal being interior to said gap seal and providing a restriction to debris passing through said gap seal.

5. A swivel as claimed in claim 4 wherein said sealing means further includes a third seal interior to said second seal, said third seal restricting passage of debris, that passes through said second seal, into the interior of said hollow body.

6. A swivel as claimed in claim 5 wherein said sealing means further comprises a fourth seal interior to said third seal, said fourth seal restricting the entry of debris or liquid into the interior of said hollow body.

7. A swivel as claimed in claim 6 including means to flush debris from the interior of said hollow body.

8. A swivel as claimed in claim 7 wherein said bearing means includes a second set of tapered roller bearings encompassing said swivel shaft, said second set of tapered roller bearings situated at a distance from said first set of tapered roller bearings and allowing for reduced frictional rotation of said swivel shaft within said hollow body when said swivel shaft is subjected to compressive loading.

9. A swivel as claimed in claim 8 wherein each of said first and said second sets of tapered roller bearings are interior to said sealing means.

10. A swivel as claimed in claims 3 or 9 wherein said first set of tapered roller bearings are pre-loaded into said hollow body, said first set of tapered roller bearings and said swivel shaft securely held within said hollow body and prevented from axial movement through tightening said locking nut against said first set of tapered roller bearings.

11. A swivel as claimed in claims 1 or 9 wherein said first and said second swivel heads have pulling eyes to allow connection of said swivel to other objects.

12. A swivel as claimed in claims 1 or 9 wherein said first and said second swivel heads, said hollow swivel body and said swivel shaft are comprised of a high strength, corrosion resistant metal.

\* \* \* \* \*